Patented Apr. 23, 1940

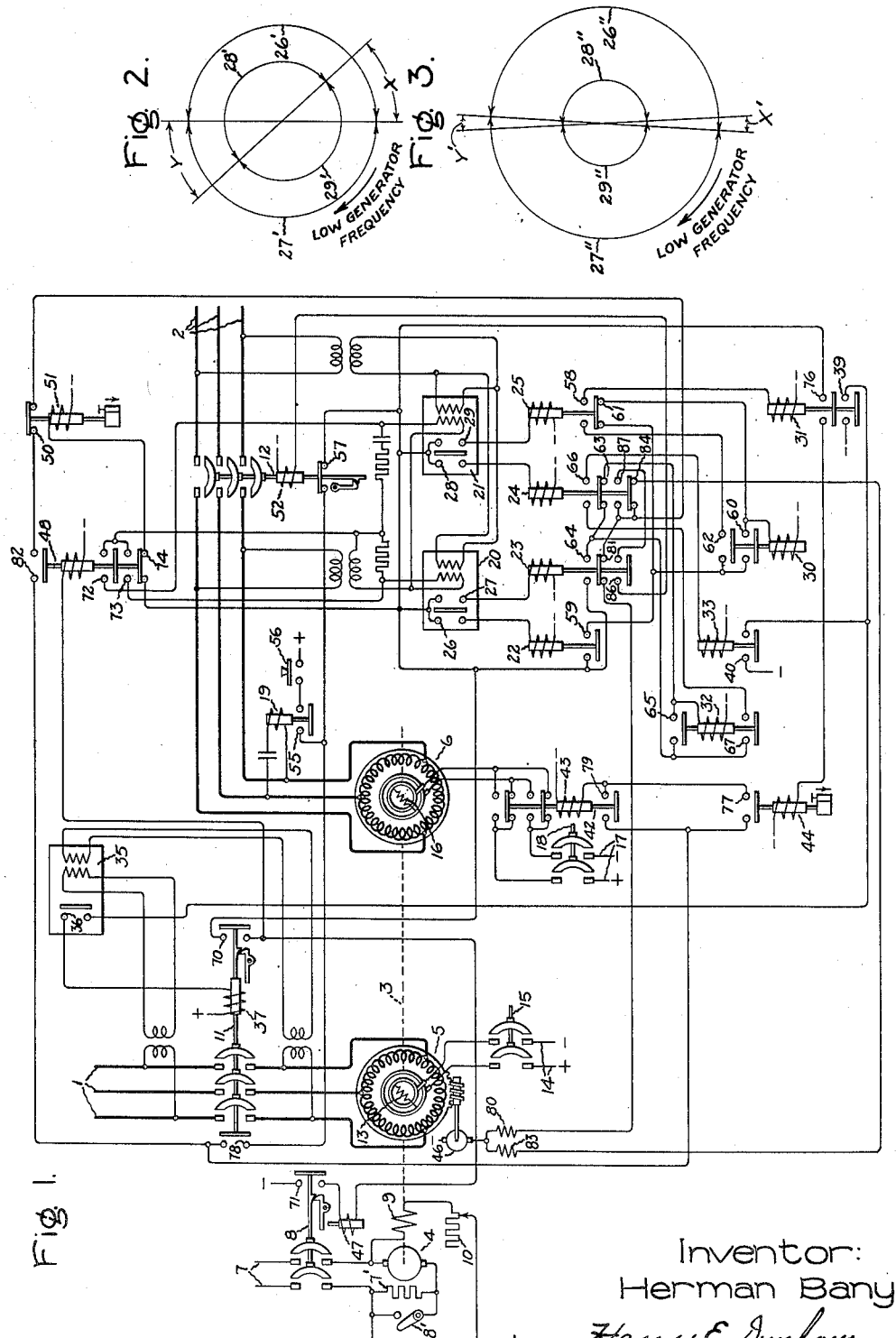

2,198,470

UNITED STATES PATENT OFFICE 2,198,470

AUTOMATIC CONTROL EQUIPMENT FOR SYNCHRONOUS FREQUENCY CONVERTERS

Herman Bany, Lansdowne, Pa., assignor to General Electric Company, a corporation of New York Application September 10, 1938, Serial No. 229,333

16 Claims. (Cl. 171—118)

My invention relates to automatic control equipments for synchronous frequency converters which interconnect two alternating current circuits of different frequencies and an object of my invention is to provide an improved automatic control equipment of the type disclosed in United States Letters Patent 2,004,776, granted June 11, 1935, and assigned to the same assignee as this application.

In the aforesaid Letters Patent the synchronous frequency converter is started and one of the two synchronous machines constituting the converter, preferably the low frequency machine, is synchronized with one of the two electric circuits irrespective of the phase relation existing between the voltages of the other synchronous machine and the other electric circuit. Then the stator of one of the synchronous machines is automatically rotated relative to its foundation so as to establish a predetermined phase relation between the voltages of the disconnected machine and the other electric circuit and, in response to this predetermined phase relation being established, the disconnected machine is connected to the other electric circuit. This prior control arrangement requires the stator shifting arrangement to be so designed that it can rotate the stator of the high frequency machine 180 electrical degrees, plus an amount to take care of the load angle which in some cases may be as much as 90 electrical degrees. In accordance with my present invention, I provide an improved arrangement whereby the first of the two synchronous machines of the frequency converter to be synchronized is synchronized only when the phase differences between the voltages of both of the machines of the converter and the circuits to which they are to be connected are respectively less than predetermined values. With such an arrangement the amount of rotation of the stator necessary to establish the proper phase relation between the voltages of the second machine to be synchronized and the circuit to which it is to be connected can be materially reduced.

My invention will be better understood from the following description when taken in connection with the accompanying drawing, Fig. 1 of which diagrammatically illustrates an automatic synchronous frequency converter control equipment embodying my invention, and Figs. 2 and 3 of which are explanatory diagrams, and its scope will be pointed out in the appended claims.

Referring to Fig. 1 of the drawing, 1 and 2 represent two alternating current circuits of different frequencies which are interconnected electrically in any suitable manner, not shown, so that a constant frequency relation is maintained between the two circuits. 3 represents a synchronous frequency converter comprising a direct current variable speed starting motor 4, a synchronous machine 5, and a synchronous machine 6, having their respective rotors mechanically connected to a common shaft. For the purpose of this description it will be assumed that 5 is a motor and 6 is a generator, but it will be obvious that the function of said machines will depend upon the direction of power flow through the converter. The starting motor 4, which is shown as a shunt motor, is arranged to be connected to a suitable direct current supply circuit 7 through a starting resistor 7' by a suitable switch 8, which is shown as being of the latched-in type. The starting resistor 7' is arranged to be short circuited by the switch 8' in any suitable manner when the motor reaches a predetermined speed. The shunt field winding 9 of the motor 4 has an adjustable resistor 10 connected in series therewith so that the speed of the shaft of the frequency converter 3 may be readily varied. The armature winding of the synchronous motor 5 is adapted to be connected to the alternating current circuit 1 by means of a suitable switch 11, and the armature winding of the synchronous generator 6 is adapted to be connected to the alternating current circuit 2 by means of a suitable switch 12. The field winding 13 of the synchronous motor 5 is adapted to be connected to a suitable source of excitation 14 by means of a field switch 15 and similarly the field winding 16 of the synchronous generator 6 is adapted to be connected to a suitable source of excitation 17 by means of a field switch 18. For the purpose of this description, it is assumed that the frequency of the alternating current circuit 1 and of the synchronous motor 5 is lower than the frequency of the alternating current circuit 2 and the synchronous generator 6. In order to simplify the disclosure, I have shown the switches 15 and 18 as being manually opened and closed and the switch 8 as being manually closed but it will be obvious to those skilled in the art that these switches may be automatically controlled in any suitable manner.

In accordance with my invention, I start the synchronous frequency converter 3 by closing the switch 8 so that the starting motor 4 is connected to the direct current supply circuit 7. Then the switches 15 and 18 are closed to excite the field windings 13 and 16 of the synchronous machines 5 and 6 respectively, and the rheostat 10 is adjusted so that the frequency converter 3 runs at a speed slightly below synchronous speed. Any suitable speed responsive means examples of which are well known in the art may be provided for indicating that the converter 3 has reached the desired speed to effect the synchronizing operation. As shown, the speed responsive means is a frequency responsive relay 19 connected to the armature winding of the generator 6. Then when a predetermined phase relation exists between the voltages of the synchronous generator 6 and the alternating current circuit 2 and at the same time the voltages of the synchronous motor 5 and the alternating current circuit 1 are in phase, the switch 11 is closed to synchronize the motor 5. The closing of the switch 11 effects the opening of the switch 8 so that the starting motor is disconnected from the direct current supply circuit 7. Then the stator of one of the synchronous machines, preferably the low frequency machine 5, is automatically shifted so as to bring the voltage of the synchronous generator 6 substantially into phase with the voltage of the circuit 2. When the proper phase relation is established between these voltages, the switch 12 is automatically closed to connect the generator 6 to the alternating current circuit 2.

For effecting the closing of the switch 11 when the voltage of the synchronous motor 5 and the alternating current circuit 1 are in phase after the converter 3 has been started and has been brought up to substantially synchronous speed, I provide a suitable automatic synchronizer 35. One type of automatic synchronizer which may be used is disclosed in United States Letters Patent 2,009,097, granted July 23, 1935, on an application filed by H. T. Seeley, and assigned to the same assignee as this application. Since the details of the automatic synchronizer 35 form no part of my present invention and such details are well known n the art, I have shown the automatic synchronizer 35 schematically in order to simplify the disclosure.

For preventing the automatic synchronizer 35 from effecting the closing of the switch 11 until the desired phase relation exists between the voltages of the synchronous generator 6 and the alternating current circuit 2, I provide the phase responsive relays 20 and 21 and the control relays 22, 23, 24, and 25. The relay 20 is connected to the armature circuit of the generator 6 and to the alternating current circuit 2 in any suitable manner, examples of which are well known in the art, so that during each slip cycle it maintains its contacts 26 closed during a predetermined phase range of the voltage of generator 6 with respect to the voltage of circuit 2, such for example as the range 26' in Fig. 2 and so that it maintains its contacts 27 closed during the remaining portion of each slip cycle, such for example as the range 27' in Fig. 2. The relay 21 is connected to the armature circuit of the generator 6 and to the alternating current circuit 2 in any suitable manner, examples of which are well known in the art so that during each slip cycle it maintains its contacts 28 closed during a different phase range of the voltage of the generator 6 with respect to the voltage of circuit 2, such for example as the range 28', and so that it maintains its contacts 29 closed during the remaining portion of each slip cycle, such as the range 29' in Fig. 2. The closing of the contacts 26, 27, 28 and 29 respectively complete energizing circuits for the control relays 22, 23, 24, and 25.

From Fig. 2 it is apparent that the phase range of the voltage of the generator 6 with respect to the voltage of circuit 2 during which the relays 22 and 25 are simultaneously energized and during which the relays 23 and 24 are simultaneously energized depends upon the calibration of the relays 20 and 21. When the relays 20 and 21 are calibrated so that they have the characteristics mentioned above and shown in Fig. 2, the relays 23 and 24 are simultaneously energized during the phase range Y which is a small range just prior to phase coincidence and the relays 22 and 25 are simultaneously energized during the phase range X which is a small range just prior to phase opposition of the voltages.

In order to allow the switch 11 to be closed during the phase ranges X and Y in Fig. 2 only when the frequency of the generator 6 is lower than the frequency of the circuit 2, I control the circuit of the closing coil 37 of the switch 11 in accordance with the sequence in which the relays 22 and 25 are energized and also in accordance with the sequence in which the relays 23 and 24 are energized. When the frequency of the generator 6 is low, it will be seen from Fig. 2 that during each slip cycle the relay 22 is energized before the relay 25 is energized. Therefore when the relay 22 becomes energized an energizing circuit for relay 30 is completed during the phase range X. The simultaneous energization of the relays 22, 25 and 30 completes an energizing circuit for a control relay 31. However, when the frequency of the generator 6 is higher than the frequency of the circuit 2, relay 25 is energized when the relay 22 becomes energized. Consequently the energizing circuit of relay 30 is completed in response to the deenergization of relay 25, but this circuit of relay 30 is opened by the deenergization of relay 22 before relay 25 is again energized. Therefore, the energizing circuit for relay 31 is never completed as the three relays 22, 25 and 30 are never simultaneously energized. Similarly the relays 23 and 24 are arranged so that during each slip cycle when the frequency of the generator 6 is low and the relay 23 is energized before the relay 24, energizing circuits are completed for the control relays 32 and 33 during the phase range Y, but during each slip cycle when the frequency of the generator 6 is higher than the frequency of the circuit 2 and the relay 24 becomes energized before the relay 23, the relay 33 is never energized.

Therefore, only when the frequency of generator 6 is lower than the frequency of circuit 2 is the relay 31 energized during the phase range X of Fig. 2 and the relay 33 energized during the phase range Y. By having the relays 31 and 33 control in any suitable manner the operation of the automatic synchronizer 35 so that it is operative to close the energizing circuit of the closing coil 37 only while the relay 31 or the relay 33 is energized, the switch 11 can be closed only during the phase ranges X and Y of the generator voltage. As shown in the drawing, the parallel connected contacts 39 of relay 31 and 40 of relay 33 are connected in series with the contacts 36 of the automatic synchronizer 35.

If the switch 11 is closed while relay 31 is energized thereby indicating that the voltage of the generator 6 is within the range X, namely substantially in opposition to the voltage of current 2 when the closing operation of the switch 11 was initiated, the generator voltage may be brought nearer phase coincidence by reversing the excitation of the generator 6. For accomplishing this result, I provide in the circuit of the field winding 16 of the generator 6 a reversing switch 42 having an operating coil 43 which when energized, causes the connections between the generator field winding 16 and the source of excitation 17 to be reversed. The circuit of the operating winding 43 is controlled by the switch 11 and by a time relay 44 which in turn is controlled by the relay 31 so that if the relay 31 is energized when the switch 11 closes, an energizing circuit is completed for the operating winding 43.

For effecting opening of the switch 8 so as to disconnect the starting motor 4 from the direct current supply circuit 7, the switch 8 is provided with a trip coil 47, the circuit of which is arranged to be completed in response to the closing of the switch 11.

After the switch 11 is closed, I provide means for shifting the stator of one of the machines of the converter 3 relative to its foundation so as to reduce the phase difference between the voltages of the generator 6 and the circuit 2 to a predetermined value and then the switch 12 is automatically closed to connect the generator 6 to the circuit 2.

As shown in Fig. 1, the stator of the motor 5 is arranged to be rotated relative to its foundation by a reversible motor 46 which is controlled so as to bring the voltages of the generator 6 and the circuit 2 into substantially phase coincidence. In order to accomplish this result, I provide means for recalibrating the phase responsive relays 20 and 21 in response to the closing of the switch 11 so that these relays have the characteristics shown in Fig. 3 whereby the contacts 26, 27, 28, and 29 are respectively closed during the phase ranges 26'', 27'', 28'', and 29'' of the generator voltage with respect to the voltage of circuit 2. For effecting this recalibration, I provide a control relay 49 which operates in response to the closing of the switch 11 to vary in any well known manner the electric constants of some of the windings of the phase responsive relays 20 and 21.

When the relays 20 and 21 have been recalibrated so that they have the characteristics shown in Fig. 3, it will be seen that the only phase range of the voltage of the generator 6 with respect to the voltage of the circuit 2, during which neither of the relays 23 and 24 is deenergized, is a very small range X' near phase coincidence of the voltages. Therefore, I control the operation of the reversible motor 46 in response to the deenergization of the relays 23 and 24. When the relay 23 is deenergized, thereby indicating that the voltage of the generator 6 is leading the voltage of the circuit 2, the relay 23 completes an energizing circuit for the stator shifting motor 46 so that the stator of the motor 5 is rotated in a direction to reduce the phase angle between the voltages. Similarly, when the relay 24 is deenergized, thereby indicating that the voltage of the generator 6 is lagging the voltage of the circuit 2, the relay 24 completes an energizing circuit for the stator shifting motor 46 so that the stator of motor 5 is rotated in the opposite direction to reduce the phase angle between the voltages.

In order to prevent any shifting of the stator of motor 5 until after the field reversing switch 42 has been closed, in case such operation of the switch 42 is necessary, I provide, in the energizing circuits of the motor 46, contacts 50 of a time relay 51 which are not closed until after the switch 11 has been closed for a predetermined time which is long enough to allow the excitation of the generator 6 to build up to its normal value after being reduced.

When the stator of the motor 5 has been shifted so that the voltage of the generator 6 is within the range X' and the relays 23 and 24 are simultaneously energized, an energizing circuit is completed for the closing coil 52 of the switch 12 to effect the connection of the armature winding of generator 6 to the circuit 2.

The operation of the control arrangement shown in Fig. 1 is as follows:

When the converter 3 is to be placed in operation, the switch 9 is first closed so as to connect the starting motor 4 to the direct current supply circuit 7 and when the motor 4 reaches a predetermined speed, switch 8' is closed to short-circuit the starting resistor 7'. Then the field switches 15 and 18 are closed and the rheostat 10 is adjusted so as to bring the set up to the desired sub-synchronous speed. When the set reaches a predetermined speed near the desired subsynchronous speed, the frequency relay 19 closes its contacts 55. The closing of a control switch 56, which may be effected in any suitable manner, either manually or automatically in response to a predetermined operating condition of the frequency converter set, then renders the automatic control apparatus operative to effect the closing of the switches 11 and 12 at the proper time. After the switch 56 is closed, an energizing circuit for relay 22 is completed through contacts 26 of relay 20, contacts 57 of switch 12, contacts 55 of relay 19 and control switch 56 each time during each slip cycle that the voltage of the generator 6 is within the phase range 26' of Fig. 2. Similarly, energizing circuits are respectively completed for relays 23, 24, and 25 during the phase ranges 27', 28' and 29' of Fig. 2.

With the frequency of the generator 6 lower than the frequency of the circuit 2, the energization of relay 22, as the voltage of the generator 6 starts to lead the voltage of circuit 2, causes an energizing circuit to be completed for relay 30 through contacts 61 of relay 25, contacts 59 of relay 22, contacts 57 of switch 12, contacts 55 of relay 19 and control switch 56. By closing its contacts 60, relay 30 completes a locking circuit for itself which is independent of the contacts 61 of relay 25. When the generator voltage leads sufficiently so that its vector falls within the phase range X of Fig. 2, relay 25 becomes energized and by closing its contacts 58 completes an energizing circuit for relay 31 through contacts 58 of relay 25, contacts 62 of relay 30, contacts 59 of relay 22, contacts 57 of switch 12, contacts 55 of relay 19 and control switch 56. This energizing circuit for relay 31 remains completed throughout the phase range X of the generator voltage and is opened when the generator voltage becomes lagging with respect to the voltage of circuit 2 so that relay 22 is deenergized and opens its contacts 59 in the circuits of relays 30 and 31.

When the relay 23 becomes energized due to the voltage of the generator 6 lagging the voltage of circuit 2, an energizing circuit is completed for relay 32 through contacts 63 of relay 24, contacts 64 of relay 23, contacts 57 of switch 12, contacts 55 of relay 19 and control switch 56. By closing its contacts 65, relay 32 completes a locking circuit for itself which is independent of the contacts 63 of relay 24. When the lag of the generator voltage is decreased sufficiently so that the generator voltage vector falls within the phase range Y, relay 24 becomes energized and by closing its contacts 66, completes an energizing circuit for relay 33 through contacts 67 of relay 32, contacts 64 of relay 23, contacts 57 of switch 12, contacts 55 of relay 19 and control switch 56. This energizing circuit for relay 33 remains completed throughout the phase range Y and is opened when the generator voltage again becomes leading with respect to the voltage of circuit 2 so that relay 23 becomes deenergized and opens its contacts 64 in the energizing circuits of relays 32 and 33.

As pointed out heretofore, if the frequency of generator 6 should for any reason become higher than the frequency of the circuit 2 so that the phase rotation of the generator vector in Fig. 2 is counter-clockwise, it is impossible for relay 31 to be energized during the phase range X because, when the generator voltage vector moves into this range, the relay 25 is already energized and, therefore, the circuit of relay 30 is open at contacts 61 of relay 25 throughout the range X. When the generator voltage vector moves out of the range X so that the relay 25 becomes deenergized, the energizing circuit for relay 30 is completed but the energizing circuit for relay 31 is open at contacts 58 of deenergized relays 25 throughout the phase range 26' and, before the relay 25 is again energized, the contacts 59 of relay 22 in the energizing circuit of relay 31 are opened. Therefore, the relay 31 remains deenergized throughout each slip cycle when the frequency of generator 6 is higher than the frequency of circuit 2. Similarly, the energizing circuit of relay 33 is maintained opened at contacts 67 of relay 32 during the phase range Y of the generator voltage and the contacts 66 of relay 24 throughout the phase range 29' and at contacts 67 of relay 32 during the remaining portion of each slip cycle when the frequency of generator 6 is higher than the frequency of circuit 2.

Relays 31 and 33, therefore, are respectively energized during the phase ranges X and Y of the generator voltage only when the frequency of generator 6 is lower than the frequency of circuit 2. The closing of the contacts 39 of relay 31 when it is energized or the closing of contacts 40 of relay 33 when it is energized completes an energizing circuit for the closing coil 37 of switch 11 so as to connect the armature winding of the motor 5 to the circuit 1 if at the same time a predetermined phase condition exists between the voltages of the machine 5 and the circuit 1, so that the contacts 36 of the automatic synchronizer 35 are closed.

By closing its auxiliary contacts 70, the switch 11 completes an energizing circuit for the trip coil 47 of switch 8 through auxiliary contacts 71 on switch 8, winding of trip coil 47, contacts 70 on switch 11, contacts 57 of switch 12, contacts 55 of relay 19 and control switch 56. The energization of trip coil 47 effects the opening of switch 8 so that the starting motor 4 is disconnected from the direct current supply circuit 7. The synchronous machine 5 now drives the frequency converter set at synchronous speed.

When the relay 31 is energized, a circuit is completed for the time delayed drop-out relay 44 through contacts 76 of relay 31, contacts 57 of switch 12, contacts 55 of relay 19 and control switch 56. Therefore, for a short time after the switch 11 is closed, in response to the generator voltage vector being within the phase range X, an energizing circuit is completed for the operating coil 43 of the reversing switch 42 through contacts 77 of relay 44, contacts 78 of switch 11, contacts 55 of relay 19 and control switch 56 so that the excitation of the generator 6 is reversed to cause the generator voltage vector to be nearer phase coincidence. By closing its contacts 79, reversing switch 42 completes a locking circuit for its operating winding 43 so that the reversing switch remains in its closed position when the relay 44 opens its contacts 77 after a time delay.

The closing of the contacts 70 of switch 11 also completes an energizing circuit for relay 48 which, by closing its contacts 72 and 73, recalibrates the phase responsive relays 20 and 21 by changing the electric constants of the circuits of the operating windings of these relays so that they have the characteristics shown in Fig. 3. By opening its contacts 74, relay 48 interrupts an energizing circuit for the time delayed drop-out relay 51 which was completed through contacts 57 of switch 12 and contacts 55 of relay 19 in response to the closing of the control switch 56. After the relay 51 has been deenergized for a predetermined time, which is long enough to allow the excitation of the generator 6 to be reversed and to build up to its normal value in case such operation is necessary, the relay 51 closes its contacts 50 in the energizing circuits of the stator shifting motor 46.

If the voltage of the generator 6 is leading the voltage of the circuit 2 so that the generator voltage vector falls within the range 26'' of Fig. 3, relay 23 is deenergized and an energizing circuit for the stator shifting motor 46 is completed through the armature winding and field winding 80 of motor 46, contacts 81 of relay 23, contacts 50 of relay 51, contacts 82 of relay 48, contacts 78 of switch 11, contacts 55 of relay 19 and control switch 56. The energization of this circuit for motor 46 causes the motor to rotate the stator of motor 5 in the proper direction to decrease the phase angle between the voltages of the generator 6 and the circuit 2 until the generator voltage vector is within the range Y' of Fig. 3 when the energizing circuit of motor 46 is opened at the contacts 86 of relay 23. If, when the relay 51 closes its contacts 50, the voltage of generator 6 is lagging the voltage of circuit 2 so that the generator voltage vector falls within the range 29'' of Fig. 3, relay 24 is deenergized and an energizing circuit for the stator shifting motor 46 is completed through the armature winding and field winding 83 of motor 46, contacts 84 of relay 24, contacts 50 of relay 51, contacts 82 of relay 48, contacts 78 of switch 11, contacts 55 of relay 19 and control switch 56. The completion of this energizing circuit for motor 46 causes the motor to rotate the stator of motor 5 in the proper direction to bring the generator voltage vector into the range Y' of Fig. 3.

When the generator voltage vector is in the range Y' of Fig. 3 at which time both of the relays 23 and 24 are energized, a circuit is completed for the closing coil 52 of switch 12 through contacts 86 of relay 23, contacts 87 of relay 24, contacts 50 of relay 51, contacts 82 of relay 48, contacts 78 of switch 11, contacts 55 of relay 19 and control switch 56. The closing of the main contacts of switch 12 connects the armature winding of generator 6 to the circuit 2, and the opening of the auxiliary contacts 57 of switch 12 removes the control of the relays 22—25, inclusive, from the phase responsive relays 20 and 21 so that the stator shifting motor 46 may be controlled in any suitable manner, examples of which are well known in the art, to vary at will the load carried by the frequency converter set 3.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. A control arrangement for a frequency converter having two synchronous machines respectively adapted to be connected to different energized alternating current circuits comprising a switch for connecting one of said machines to one of said circuits, means dependent upon the voltages of the other machine and the other circuit being within a predetermined range near phase coincidence or phase opposition for effecting the closing of said switch, and means for reversing the excitation of said other machine when said last mentioned voltages are in said predetermined range near phase opposition.

2. A control arrangement for a frequency converter having two synchronous machines respectively adapted to be connected to different energized alternating current circuits comprising a switch for connecting one of said machines to one of said circuits, means dependent upon the voltages of the other machine and the other circuit being within a predetermined range near phase coincidence or phase opposition for effecting the closing of said switch, means for reversing the excitation of said other machine if said last mentioned voltages are in said predetermined range near phase opposition and for establishing another predetermined angular relation near phase coincidence of said last mentioned voltages after said switch is closed.

3. A control arrangement for a frequency converter having two synchronous machines respectively adapted to be connected to different energized alternating current circuits comprising a switch for connecting one of said machines to one of said circuits, means responsive to the voltages of the other machine and the other circuit being within a predetermined phase range for effecting the closing of said switch, and means for varying the phase angle between said last mentioned voltages to establish another predetermined angular relation between said last mentioned voltages after said switch is closed.

4. A control arrangement for a frequency converter having two synchronous machines respectively adapted to be connected to different energized alternating current circuits comprising a switch for connecting one of said machines to one of said circuits, means responsive to the voltages of the other machine and the other circuit being within a predetermined phase range for effecting the closing of said switch, and means for shifting the stator of one of said machines relative to its foundation after said switch is closed to establish a predetermined angular relation between said last mentioned voltages.

5. A control arrangement for a frequency converter having two synchronous machines respectively adapted to be connected to different energized alternating current circuits comprising a switch for connecting one of said machines to one of said circuits, means responsive to the voltages of the other machine and the other circuit being within a predetermined phase range for effecting the closing of said switch, means for shifting the stator of one of said machines relative to its foundation to establish a predetermined angular relation between said last mentioned voltages after said switch is closed, and means responsive to the establishment of said predetermined angular relation between said last mentioned voltage for effecting the connection of said other machine to said other circuit.

6. A control arrangement for a frequency converter having two synchronous machines respectively adapted to be connected to different energized alternating current circuits comprising a switch for connecting one of said machines to one of said circuits, means including relays responsive to different predetermined phase relations between the voltages of the other machine and the other circuit for closing said switch and for effecting a recalibration of said relays, and means controlled by said recalibrated relays for establishing a predetermined angular relation between said last mentioned voltages.

7. A control arrangement for a converter having two synchronous machines respectively adapted to be connected to different energized alternating current circuits comprising a switch for connecting one of said machines to one of said circuits, means including relays responsive to different predetermined phase relations between the voltages of the other machine and the other circuit for closing said switch, means responsive to the closing of said switch for recalibrating said relays, and means controlled by said recalibrated relays for shifting the stator of one of said machines relative to its foundation so as to establish a predetermined angular relation between said last mentioned voltages.

8. A control arrangement for a frequency converter having two synchronous machines respectively adapted to be connected to different energized alternating current circuits comprising a switch for connecting one of said machines to one of said circuits, means including relays responsive to different predetermined phase relations between the voltages of the other machine and the other circuit for closing said switch, means for recalibrating said relays after said switch is closed, means controlled by said recalibrated relays for establishing a predetermined angular relation between said last mentioned voltages, and means responsive to the establishment of said predetermined angular relation between said last mentioned voltages for effecting the connection of said other machine to said other circuit.

9. A control arrangement for a frequency converter having two synchronous machines respectively adapted to be connected to different energized alternating current circuits comprising a switch for connecting one of said machines to one of said circuits, means including relays responsive to different predetermined phase relations between the voltages of the other machine and the other circuit for closing said switch and for effecting a recalibration of said relays, means controlled by said recalibrated relays for shifting the stator of one of said machines relative to its foundation so as to establish a predetermined angular relation between said last mentioned voltages, and means responsive to the establishment of said predetermined angular relation between said last mentioned voltages for effecting the connection of said other machine to said other circuit.

10. A control arrangement for a frequency converter having two synchronous machines respectively adapted to be connected to different energized alternating current circuits comprising a switch for connecting one of said machines to one of said circuits, means dependent upon the voltages of the other machine and the other circuit being within a predetermined phase range near phase coincidence or phase opposition for effecting the closing of said switch, means for reversing the excitation of said other machine when said last mentioned voltages are in said predetermined range near phase opposition, means for establishing another predetermined angular relation near phase coincidence of said last mentioned voltages when said switch is closed, and means responsive to the establishment of said predetermined angular relation between said last mentioned voltages for effecting the connection of said other machine and said other circuit.

11. A control arrangement for a frequency converter having two synchronous machines respectively adapted to be connected to different energized alternating current circuits comprising a switch for connecting one of said machines to one of said circuits, means dependent upon the voltages of the other machine and the other circuit being within a predetermined phase range near phase coincidence or phase opposition for effecting the closing of said switch, means responsive to the closing of said switch for reversing the excitation of said other machine if said last mentioned voltages are in said predetermined range near phase opposition, means responsive to the closing of said switch for shifting the stator of one of said machines relative to its foundation to establish a predetermined angular relation between said last mentioned voltages.

12. A control arrangement for a frequency converter having two synchronous machines respectively adapted to be connected to different energized alternating current circuits comprising a switch for connecting one of said machines to one of said circuits, means dependent upon the voltages of the other machine and the other circuit being within a predetermined range near phase coincidence or phase opposition for effecting the closing of said switch, means responsive to the closing of said switch for reversing the excitation of said other machine if said last mentioned voltages are in said predetermined range near phase opposition, means responsive to the closing of said switch for shifting the stator of one of said machines relative to its foundation to establish a predetermined angular relation between said last mentioned voltages, and means responsive to the establishment of said predetermined angular relation between said last mentioned voltages for effecting the connection of said other machine and said other circuit.

13. A control arrangement for a frequency converter having two synchronous machines respectively adapted to be connected to different energized alternating current circuits comprising driving means for said converter, a switch for connecting one of said machines to one of said circuits, and means responsive to a predetermined phase relation between the voltages of the other machine and the other circuit for controlling the closing of said switch and for rendering said driving means inoperative to drive said converter.

14. A control arrangement for a frequency converter having two synchronous machines respectively adapted to be connected to different energized alternating current circuits comprising a starting motor for said converter, a source of current connected to said starting motor, a switch for connecting one of said machines to one of said circuits, and means responsive to a predetermined phase relation between the voltages of the other machine and the other circuit for controlling the closing of said switch and for disconnecting said starting motor from said source.

15. A control arrangement for a frequency converter having two synchronous machines respectively adapted to be connected to different energized alternating current circuits comprising driving means for said converter, a switch for connecting one of said machines to one of said circuits, means responsive to a predetermined phase relation simultaneously existing between the voltages of said machines and the respective circuits to which they are adapted to be connected for controlling the closing of said switch and for rendering said driving means inoperative to drive said converter.

16. A control arrangement for a frequency converter having two synchronous machines respectively adapted to be connected to different energized alternating current circuits comprising a switch for connecting one of said machines to one of said circuits, means responsive to a predetermined phase relation simultaneously existing between the voltages of said machines and the respective circuits to which they are adapted to be connected for controlling the closing of said switch, a starting motor for said converter, a source of current connected to said starting motor, and means responsive to the closing of said switch for disconnecting said starting motor from said source.

HERMAN BANY.